Oct. 21, 1924.  
C. E. DYER  
1,512,832  
NUT LOCK  
Original Filed Dec. 15, 1922
Fig.1.
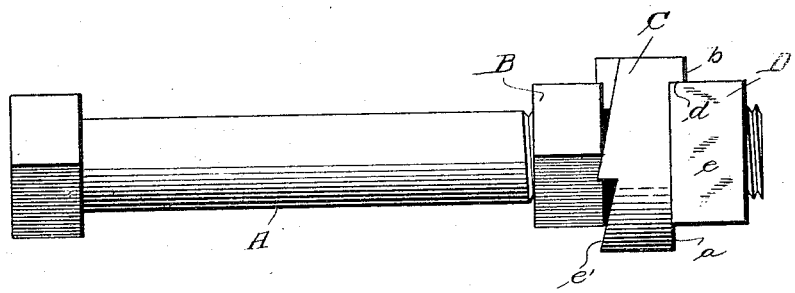
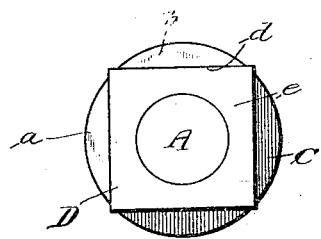
Fig.2.
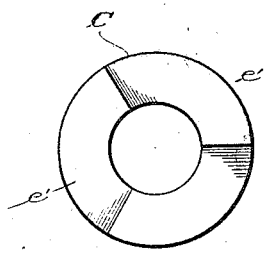
Fig.3.
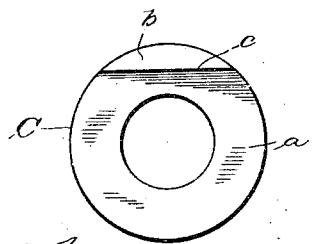
Fig.4.
Inventor  
C.E.Dyer  
By  
Attorney Patented Oct. 21, 1924.

1,512,832

UNITED STATES PATENT OFFICE.

CHARLES E. DYER, OF ALMA, ARKANSAS.

NUT LOCK.

Application filed December 15, 1922, Serial No. 607,091. Renewed June 18, 1924.

*To all whom it may concern:*

Be it known that I, CHARLES E. DYER, a citizen of the United States, residing at Alma, in the county of Crawford and State of Arkansas, have invented certain new and useful Improvements in Nut Locks, of which the following is a specification.

This invention relates to new and useful improvements in nut locks and has for its object to provide a simple and efficient device of this character which will effectually prevent the nut from working loose or unscrewing on the bolt and thereby eliminate liability of accident or injury due to this common cause.

With the foregoing objects in view the invention consists in the novel features of construction, combination and arrangement of parts illustrated in the accompanying drawing and more particularly pointed out in the appended claim.

In the accompanying drawings, which are for illustrative purposes only and are therefore not drawn to scale:—

Figure 1 is a side elevation, illustrating the application of my invention.

Figure 2 is an end view of Figure 1.

Figure 3 is an inside face view of the locking ring or washer, and

Figure 4 an outer face view thereof.

Referring to the drawings for a more particular description of my invention and in which drawings like parts are designated by like reference characters throughout the several views, A designates a bolt of any ordinary or approved construction, B the nut, C my locking ring or washer and D the lock nut.

In carrying out my invention the outer face $a$ of the locking ring or washer is made flat and provided at its edge with an outwardly projecting lip $b$ whose inner straight edge $c$ fits over and engages one edge, as $d$, of the nut lock $e$, the purpose of which will presently appear. The inner face of the locking ring or washer C is formed with a series of three or more outwardly inclined arcuate teeth $e$, whose outer ends work against the outer base of the nut B.

In practice the locking ring and lock nut C and D are screwed on the threaded end of the bolt A as a unit until the inner face of the former engages the outer face of the nut B. Under these circumstances, it will be impossible for the nut to work loose on the bolt by virtue of the fact that any reverse rotation of the nut B will cause it to more tightly bind against the outwardly inclined teeth or surfaces $e$ of the locking ring or washer C.

From the foregoing description taken in connection with the drawings, it is thought that the construction, operation and advantages of my invention will be readily understood without requiring a more extended explanation.

Having described my invention, what I claim as new and desire to secure by Letters Patent, is:—

A nut lock comprising a locking ring or washer and a lock nut screwing on the threaded end of the bolt against the outer face of the former, said locking ring or washer formed on its inner edge or face with a continuous series of inwardly inclined teeth or surfaces whose outer ends engage the outer face of the nut and formed on its outer face with an outwardly projecting lip having a straight inner edge adapted to engage one edge of the lock nut.

In testimony whereof I affix my signature.

CHARLES E. DYER.